H. C. WILLIAMS.
SEWER TRAP.
APPLICATION FILED JAN. 17, 1910.
1,081,354.
Patented Dec. 16, 1913.
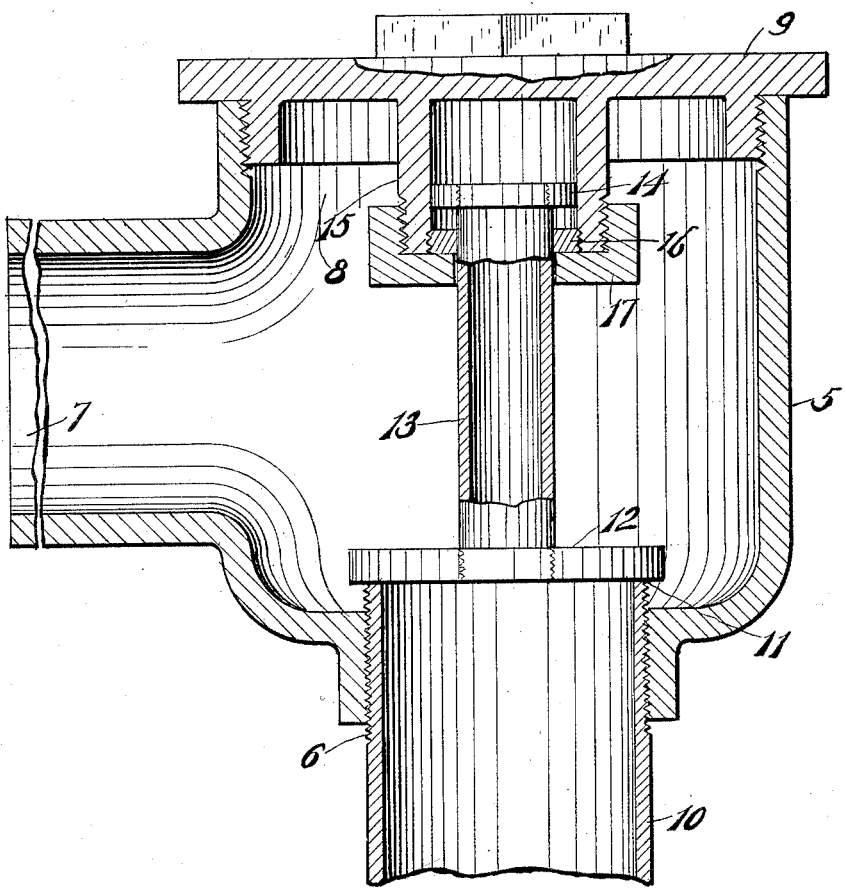
WITNESSES.
INVENTOR.
Henry C. Williams.
By Benedict, Morsell & Caldwell
ATTORNEYS.

UNITED STATES PATENT OFFICE.

HENRY C. WILLIAMS, OF MILWAUKEE, WISCONSIN.

SEWER-TRAP.

1,081,354.     Specification of Letters Patent.     Patented Dec. 16, 1913.

Application filed January 17, 1910. Serial No. 538,388.

*To all whom it may concern:*

Be it known that I, HENRY C. WILLIAMS, residing in Milwaukee, in the county of Milwaukee and State of Wisconsin, have invented new and useful Improvements in Sewer-Traps, of which the following is a description, reference being had to the accompanying drawing, which are a part of this specification.

This invention relates to improvements in sewer traps.

The object of this invention is to provide a sewer trap with a check valve which is connected to the cover of the casing and is removable therewith from the casing.

A further object of the invention is to provide a form of sewer trap valve which is simple in construction and inexpensive to manufacture and is not liable to get out of order.

With the above object in view, the invention consists of the sewer trap valve and its parts and combinations, and all equivalents thereof, as hereinafter set forth.

In the accompanying drawing in which the same reference characters indicate the same parts in the view the figure is a vertical sectional view of the improved sewer trap valve, parts broken away to show interior construction.

Referring to the drawing the numeral 5 indicates the sewer trap casing which is provided with an inlet opening 6, an outlet opening 7 and a covered opening 8 provided with a screw cap 9 threaded thereto. The portion of the casing forming the inlet opening is threaded to receive the end of a pipe 10 which may be of any length desired. The upper end of this pipe is cut smooth to form a valve seat 11 upon which is positioned a disk valve 12 having a tubular stem 13 extending vertically therefrom. A head 14 threaded to the upper end of the valve stem is positioned to be guided in the tubular guide 15 depending from and forming part of the screw cap 9. A nut 16 loosely surrounding the valve stem and threaded to the inner portion of the tubular guide 15 is adapted to guide said valve stem and to connect said valve to the screw cap to be removed therewith. A cap nut 17 threaded to the outer portion of the tubular guide serves to lock the inner nut in place and also acts as a guide for the valve stem.

The portion of the trap casing provided with the outlet opening 7 is of comparatively considerable length for convenience in making other pipe connections therewith.

In operation the water will enter through the inlet opening and lift the valve from its seat and flow out through the discharge opening. The valve stem and its connection with the screw cap will guide the valve and cause it to open easily and if the flow starts in the opposite direction the check valve will close by gravity and stop the return of the water.

From the foregoing description it will be seen that the trap is very simple in construction and operation and when it is desired to examine the trap the cap is unscrewed and in removing the cap the valve will also be moved therewith.

What I claim as my invention is:

1. A sewer trap valve, comprising a casing provided with inlet and outlet openings, a screw cap forming part of the casing and provided with a threaded depending tubular guide portion, a tube threaded to the casing at the inlet opening and forming a valve seat, a valve resting on the valve seat, a valve stem connected to the valve and extending into the tubular guide portion, a head threaded to the upper end of the valve stem, a nut threaded to the inner portion of the tubular guide and provided with an opening through which the valve stem extends and which is adapted and constructed to engage the head of the valve stem and prevent its withdrawal from the tubular guide, and another nut also provided with an opening through which the valve stem extends threaded to the outer portion of the tubular guide portion.

2. A sewer trap valve, comprising a casing provided with inlet and outlet openings, a screw cap forming part of the casing and positioned above one of the openings and provided with a threaded depending tubular guide portion, a disk valve covering the opening beneath the cap and provided with an upstanding stem having a head formed on its upper end which is guided in the tubular guide portion, and a nut threaded on the lower end of the tubular guide and provided with an opening through which the valve stem extends, said guide being of sufficient length to permit the free vertical play of said valve and the said nut serving to engage the head of the stem and lift said valve from its seat when the cap is unscrewed from the casing.

In testimony whereof, I affix my signature, in presence of two witnesses.

HENRY C. WILLIAMS.

Witnesses:
C. H. KEENEY,
ANNA F. SCHMIDTBAUER.

Copies of this patent may be obtained for five cents each, by addressing the "Commissioner of Patents, Washington, D. C."